(12) United States Patent
Brookner et al.

(10) Patent No.: US 10,281,571 B2
(45) Date of Patent: May 7, 2019

(54) PHASED ARRAY ANTENNA USING STACKED BEAMS IN ELEVATION AND AZIMUTH

(71) Applicant: Raytheon Company, Waltham, MA (US)

(72) Inventors: Eli Brookner, Lexington, MA (US); Thomas V. Sikina, Acton, MA (US); Peter R. Drake, Northborough, MA (US); Yuchoi F. Lok, Framingham, MA (US); Jacqueline M. Bourgeois, Sudbury, MA (US); Daniel F. Rypysc, Holliston, MA (US); Francis Hartwich, Holliston, MA (US); Yueh-Chi Chang, Northborough, MA (US); Leon Green, Newton, MA (US)

(73) Assignee: Raytheon Company, Waltham, MA (US)

( * ) Notice: Subject to any disclaimer, the term of this patent is extended or adjusted under 35 U.S.C. 154(b) by 537 days.

(21) Appl. No.: 14/831,146

(22) Filed: Aug. 20, 2015

(65) Prior Publication Data

US 2016/0054439 A1 Feb. 25, 2016

Related U.S. Application Data

(60) Provisional application No. 62/040,186, filed on Aug. 21, 2014.

(51) Int. Cl.
*G01S 7/02* (2006.01)
*H01Q 3/02* (2006.01)
(Continued)

(52) U.S. Cl.
CPC .............. *G01S 13/42* (2013.01); *G01S 7/024* (2013.01); *G01S 13/91* (2013.01); *G01S 13/95* (2013.01);
(Continued)

(58) Field of Classification Search
CPC .......... G01S 13/42; G01S 7/024; G01S 13/91; G01S 13/95; G01S 13/426; G01S 13/003;
(Continued)

(56) References Cited

U.S. PATENT DOCUMENTS 2,078,302 A * 4/1937 Wolff ....................... H03C 7/02
332/165
3,021,521 A 2/1962 Hutchins
(Continued)

OTHER PUBLICATIONS

Notice of Allowance dated Mar. 30, 2016; For U.S. Appl. No. 13/875,008; 25 pages.
(Continued)

*Primary Examiner* — Timothy A Brainard
*Assistant Examiner* — Nuzhat Pervin
(74) *Attorney, Agent, or Firm* — Daly, Crowley, Mofford & Durkee, LLP

(57) ABSTRACT

A radar system uses a rotating antenna array having rows that display dispersive properties while feeding multiple radiating elements. In some embodiments, the radiating elements are dual polarized. In at least one embodiment, beam spoiling may be used to generate an unfocused transmit beam that covers an entire elevation range of interest. Digital beam forming may be used during a receive mode to achieve a stack of narrow-width receive beams in elevation. Frequency scanning may also be used to achieve stacked beams in azimuth.

28 Claims, 14 Drawing Sheets

(51) Int. Cl.
*H01Q 3/22* (2006.01)
*H01Q 3/38* (2006.01)
*G01S 13/42* (2006.01)
*G01S 13/91* (2006.01)
*G01S 13/95* (2006.01)
*H01Q 13/20* (2006.01)

(52) U.S. Cl.
CPC .................. *H01Q 3/02* (2013.01); *H01Q 3/22* (2013.01); *H01Q 3/38* (2013.01); *H01Q 13/20* (2013.01); *Y02A 90/18* (2018.01)

(58) Field of Classification Search
CPC ........ G01S 13/4409; H01Q 3/02; H01Q 3/22; H01Q 3/38; H01Q 13/20; H01Q 19/17; H01Q 21/005; H01Q 1/28; H01Q 1/084; H01Q 25/004
USPC ........................................................ 342/26 R
See application file for complete search history.

(56) References Cited

U.S. PATENT DOCUMENTS

| | | | |
|---|---|---|---|
| 3,028,597 A * | 4/1962 | Kliger | H01J 25/38 315/3.5 |
| 3,256,520 A | 6/1966 | Blitz | |
| 3,258,774 A * | 6/1966 | Kinsey | H01Q 3/34 342/154 |
| 3,324,475 A * | 6/1967 | Milne | H01Q 3/22 342/158 |
| 3,419,870 A * | 12/1968 | Wong | H01Q 3/22 343/768 |
| 3,434,139 A * | 3/1969 | Algeo | G01S 13/4409 342/371 |
| 3,438,035 A * | 4/1969 | Fling | H01Q 3/22 342/371 |
| 3,518,689 A * | 6/1970 | Algeo | H01Q 3/22 342/375 |
| 3,564,258 A | 2/1971 | Feingold | |
| 3,943,523 A * | 3/1976 | Fassett | H01P 1/268 342/368 |
| 3,953,857 A * | 4/1976 | Jenks | H01Q 1/281 343/705 |
| 3,971,020 A * | 7/1976 | Howard | G01S 7/12 342/129 |
| 4,119,971 A * | 10/1978 | Stark | H01Q 3/22 342/375 |
| 4,197,540 A | 4/1980 | Riggs et al. | |
| 4,216,472 A | 8/1980 | Albanese | |
| 4,359,742 A * | 11/1982 | Smith | H01Q 21/005 343/768 |
| 4,376,281 A * | 3/1983 | Smith | H01Q 21/005 343/768 |
| 4,649,390 A * | 3/1987 | Andrews | G01S 13/426 342/140 |
| 4,675,681 A * | 6/1987 | Kinsey | H01Q 25/004 342/372 |
| 4,677,440 A * | 6/1987 | Edson | H01Q 3/22 342/157 |
| 4,725,842 A | 2/1988 | Mayberry | |
| 4,868,574 A * | 9/1989 | Raab | G01S 13/66 342/81 |
| 4,970,519 A | 11/1990 | Minnis et al. | |
| 5,066,956 A * | 11/1991 | Martin | G01S 13/426 342/154 |
| 5,173,706 A * | 12/1992 | Urkowitz | G01S 7/032 342/101 |
| 5,202,700 A * | 4/1993 | Miller | H01Q 19/17 343/840 |
| 5,239,301 A * | 8/1993 | Martin | H01Q 3/22 342/368 |
| 5,343,211 A | 8/1994 | Kott | |
| 5,646,625 A | 7/1997 | Burrier | |
| 5,861,837 A | 1/1999 | Richardson et al. | |
| 5,911,692 A | 6/1999 | Hussain et al. | |
| 5,966,048 A | 10/1999 | Thompson | |
| 5,969,667 A | 10/1999 | Farmer et al. | |
| 6,028,562 A * | 2/2000 | Guler | H01Q 13/10 343/770 |
| 6,043,791 A | 3/2000 | Kinsey | |
| 6,078,289 A | 6/2000 | Manoogian et al. | |
| 6,114,997 A | 9/2000 | Lee et al. | |
| 6,166,701 A | 12/2000 | Park et al. | |
| 6,218,987 B1 | 4/2001 | Derneryd et al. | |
| 6,252,542 B1 | 6/2001 | Sikina et al. | |
| 6,279,399 B1 | 8/2001 | Holm | |
| 6,377,204 B1 * | 4/2002 | Wurman | G01S 13/003 342/59 |
| 6,438,253 B1 * | 8/2002 | Barbaresco | G06K 9/0063 382/103 |
| 6,496,158 B1 | 12/2002 | Ksienski et al. | |
| 6,507,315 B2 | 1/2003 | Purdy et al. | |
| 6,621,470 B1 | 9/2003 | Boeringer et al. | |
| 6,680,698 B2 * | 1/2004 | Eiges | H01Q 1/28 342/361 |
| 6,799,014 B2 | 9/2004 | Rosen et al. | |
| 6,801,153 B2 | 10/2004 | Rauch et al. | |
| 6,856,284 B1 | 2/2005 | Cangiani | |
| 6,933,878 B1 | 8/2005 | Molyneux-Berry | |
| 6,963,312 B2 | 11/2005 | Schuneman et al. | |
| 7,180,457 B2 | 2/2007 | Trott et al. | |
| 7,202,812 B2 | 4/2007 | Krikorian et al. | |
| 7,250,902 B2 | 7/2007 | Manoogian et al. | |
| 7,289,079 B2 | 10/2007 | Rupp et al. | |
| 7,423,578 B1 * | 9/2008 | Tietjen | G01S 7/03 342/157 |
| 7,474,262 B2 | 1/2009 | Alland | |
| 7,477,921 B2 | 1/2009 | Shattil | |
| 7,492,313 B1 | 2/2009 | Ehret et al. | |
| 7,517,317 B2 | 4/2009 | Lazenby et al. | |
| 7,538,564 B2 | 5/2009 | Ehrmann et al. | |
| 7,576,682 B1 * | 8/2009 | Yu | G01S 7/2813 342/147 |
| 7,737,879 B2 * | 6/2010 | Tietjen | G01S 7/03 342/157 |
| 7,741,992 B2 | 6/2010 | Wang et al. | |
| 7,808,427 B1 | 10/2010 | Sarcione et al. | |
| 8,248,298 B2 * | 8/2012 | Lalezari | H01Q 21/24 342/120 |
| 8,446,326 B2 * | 5/2013 | Tietjen | H01Q 1/084 343/757 |
| 8,547,275 B2 * | 10/2013 | Culkin | G01S 13/4463 342/153 |
| 8,866,686 B1 | 10/2014 | Sikina et al. | |
| 9,182,485 B1 * | 11/2015 | Andrews | H01Q 3/30 |
| 9,297,896 B1 * | 3/2016 | Andrews | H01Q 3/30 |
| 2004/0080463 A1 | 4/2004 | Jeong | |
| 2005/0012658 A1 * | 1/2005 | Eriksson | H01Q 3/267 342/174 |
| 2005/0012665 A1 | 1/2005 | Runyon et al. | |
| 2005/0146477 A1 | 7/2005 | Kelly et al. | |
| 2006/0164284 A1 | 7/2006 | Pauplis et al. | |
| 2006/0273952 A1 | 12/2006 | Krikorian et al. | |
| 2007/0085727 A1 | 4/2007 | Backes et al. | |
| 2008/0204318 A1 | 8/2008 | Thomas et al. | |
| 2008/0272959 A1 | 11/2008 | Meharry et al. | |
| 2009/0002249 A1 | 1/2009 | Bloss et al. | |
| 2010/0245157 A1 * | 9/2010 | Wicks | G01S 13/5248 342/162 |
| 2011/0187583 A1 | 8/2011 | Nouvel et al. | |
| 2012/0319900 A1 | 12/2012 | Johansson et al. | |
| 2013/0201054 A1 * | 8/2013 | Wang | G01S 13/0218 342/93 |
| 2016/0047883 A1 * | 2/2016 | Baker | G01S 5/0273 342/126 |

OTHER PUBLICATIONS

U.S. Appl. No. 12/635,893, filed Dec. 11, 2009, Schuss et al.
U.S. Appl. No. 12/730,533, filed Mar. 24, 2010, Schuss et al.

(56) References Cited

OTHER PUBLICATIONS

U.S. Appl. No. 13/662,641, filed Oct. 29, 2012, Schuss et al.
U.S. Appl. No. 13/875,008, filed May 1, 2013, Schuss et al.
U.S. Appl. No. 13/945,197, filed Jul. 18, 2013, Schuss et al.
Hannan et al., "Simulation of a Phased-Array Antenna in Waveguide", IEEE Transactions on Antennas and Propagation, 12 pages, Mar. 11, 2009 downloaded from IEEE.
Wang et al., "Analysis of Concated Waveforms and Required STC", RadarCon May 26-30, IEEE 2008, 7 pages.
Wang et al., "Design and Implementation of Long Range Radar Service Life Extension", IEEE RadarCon 2009, Pasedena, CA, 6 pages.
Wang et al., "Modernization of En Route Air Surveillance Radar", IEEE Transactions on Aerospace and Electronic Systems, vol. 48, No. 1, Jan. 2012, 13 pages.
U.S. Appl. No. 13/826,926 Notice of Allowance dated Aug. 19, 2013, 11 pages.
U.S. Appl. No. 13/826,926 Office Action dated Dec. 27, 2013, 9 pages.
U.S. Appl. No. 13/826,926 Response filed on Jun. 27, 2014, 10 pages.
U.S. Appl. No. 13/826,926 Notice of Allowance dated Jul. 15, 2015, 6 pages.

\* cited by examiner

PHASED ARRAY ANTENNA USING STACKED BEAMS IN ELEVATION AND AZIMUTH

CROSS REFERENCE TO RELATED APPLICATION

The present application claims the benefit of U.S. Provisional Patent Application No. 62/040,186, filed on Aug. 21, 2014, which is incorporated herein by reference.

BACKGROUND

Radar systems are electronic systems that use radio waves to derive information about remote targets. The targets may be physical objects, such as aircraft or missiles, or natural occurrences, like weather formations. In a typical implementation, a radio wave is launched toward an area where a target may be located. Reflections from a target, if any, are then analyzed to determine information about the targets. The information can include, for example, the range of the target, the speed of the target, the altitude of the target, the direction of the target, the size of the target, and/or other information. Modern radar systems are used to perform a wide variety of different applications, both military and commercial.

Radar systems can be complex systems. As with most complex electronic systems, development and operational costs of radar systems are often an issue. That is, it is generally desirable to develop systems that will perform a desired radar function at a lowest cost possible. Thus, radar architectures and associated operating methods are needed that are capable of achieving good performance at relatively low cost.

SUMMARY

In accordance with one aspect of the concepts, systems, circuits, and techniques described herein, a radio frequency (RF) system comprises: an array antenna having a plurality of rows of radiating elements, wherein at least some of the rows have dispersive qualities that allow frequency scanning to be used with the row; a motor to rotate the array antenna about an axis; a plurality of transmit/receive (T/R) modules coupled to rows of the array antenna, the plurality of T/R modules including at least a first T/R module coupled to a port of a first row of the array antenna and a second T/R module coupled to a port of a second row of the array antenna; and one or more digital processors coupled to the plurality of T/R modules to generate waveforms to be transmitted from the array antenna and to process return signals received by the array antenna, the one or more processors configured to: (a) generate a recurring radar waveform having at least a transmit portion and a receive portion, the transmit portion having multiple successive pulses at different RF frequencies to cause transmit beams to be generated by the array antenna at different azimuth angles, the recurring radar waveform having a pulse repetition frequency; (b) process return signals associated with the recurring radar waveform using digital beam forming (DBF) to generate a stack of narrow receive beams in elevation; and (c) process data associated with the stack of narrow receive beams using maximum likelihood estimation (MLE) to generate an estimate of target elevation angle.

In one embodiment, the one or more processors are configured to: generate multiple successive radar waveforms at a first pulse repetition frequency (PRF) to form a first coherent processing interval (CPI); generate multiple successive radar waveforms at a second PRF to form a second CPI, the second PRF being different from the first PRF; and process return data received during at least the first and second CPIs using MLE to generate an estimate of target azimuth angle, wherein the different PRFs associated with the first and second CPIs are used to reduce Doppler and range ambiguities. In some situations, a $3^{rd}$ and $4^{th}$, or more, radar period intervals with a $3^{rd}$ and $4^{th}$, or more, PRF is used generate a $3^{rd}$ and $4^{th}$, or more, PRFs. The processed data from these CPIs would be used to obtain a MLE estimate of target elevation and azimuth angle.

In one embodiment, the number of successive radar waveforms generated for the different CPIs is based at least in part on the dwell time of the radar on target.

In one embodiment, the one or more digital processors are configured to process return data associated with the transmit beams at different elevation and azimuth angles using MLE to generate an estimate of target elevation and azimuth angle.

In one embodiment, the first row of the array antenna includes dual polarized radiating elements, the first row having a first port associated with a first polarization direction and a second port associated with a second, orthogonal polarization direction.

In one embodiment, the plurality of T/R modules includes a first T/R module that includes a first port coupled to the first port of the first row of the array antenna and a second port coupled to the second port of the first row of the array antenna.

In one embodiment, the one or more digital processors are configured to: generate the recurring radar waveform to include a first pulse at a first RF frequency that causes a first transmit beam to be generated by the array antenna at a first azimuth frequency and a second pulse at a second RF frequency that causes a second transmit beam to be generated by the array antenna at a second azimuth frequency, wherein the recurring radar waveform changes pulse repetition frequency based at least in part on a dwell time associated with the array antenna.

In one embodiment, the one or more digital processors are configured to: generate the recurring radar waveform to include at least a first plurality of transmit pulses associated with a first radar application and a second plurality of transmit pulses associated with a second radar application that is different from the first radar application.

In one embodiment, the transmit pulses of the first and second plurality of transmit pulses each have a different RF frequency, wherein the one or more digital processors are configured to transmit the transmit pulses of the first and second plurality of transmit pulses using the same polarization.

In one embodiment, the one or more digital processors are configured to transmit the transmit pulses of the first plurality of transmit pulses at a different polarization than the transmit pulses of the second plurality of transmit pulses.

In one embodiment, the one or more digital processors are configured to transmit the transmit pulses of the first plurality of transmit pulses at a slant left (or vertical (V), or horizontal (H)) polarization and the transmit pulses of the second plurality of transmit pulses at a slant right (V, or H polarization).

In one embodiment, one radar application is an air traffic control application and the other radar application is a weather radar application.

In one embodiment, multiple rows of the array antenna include dual polarized radiating elements and corresponding T/R modules have separate channels for horizontal and vertical polarization, wherein the separate channels for horizontal and vertical polarization each have a variable phase shifter that is controllable by the one or more digital processors.

In accordance with another aspect of the concepts, systems, circuits, and techniques described herein, a method of operating a radar system having a rotating array antenna that includes a plurality of rows of radiating elements, wherein the rows display dispersive properties, the method comprising: (a) transmitting multiple pulses during a transmit portion of a pulse repetition interval (PRI) from the array antenna, each of the multiple pulses having a different RF frequency to form a transmit beam at a different azimuth angle from the other pulses, wherein transmitting multiple pulses includes transmitting each of the multiple pulses using beam spoiling to achieve a transmit beam that covers an elevation angle range of interest; (b) processing return signals using digital beam forming (DBF) to develop a plurality of relatively narrow receive beams in elevation possibly with large overlaps; and (c) processing data associated with the plurality of relatively narrow focused overlapping receive beams in elevation using MLE to estimate a target elevation angle.

In one embodiment, the method further comprises processing return data associated with transmit beams at different azimuth angles using MLE to estimate a target azimuth angle.

In one embodiment, processing return data associated with transmit beams at different azimuth angles using MLE includes processing return data associated with transmit beams at different azimuth angles for multiple successive coherent processing intervals (CPIs), each of the multiple successive CPIs using a different pulse repetition frequency.

In one embodiment, transmitting multiple pulses during a transmit portion of a pulse repetition interval (PRI) from the array antenna includes transmitting a first plurality of pulses associated with a first radar application and transmitting a second plurality of pulses associated with a second radar application, wherein the first plurality of pulses use the same or different RF frequencies than the second plurality of pulses.

In one embodiment, transmitting multiple pulses during a transmit portion of a pulse repetition interval (PRI) from the array antenna includes transmitting a first plurality of pulses associated with a first radar application and transmitting a second plurality of pulses associated with a second radar application, wherein the first plurality of pulses are transmitted at orthogonal polarization with respect to the second plurality of pulses or at same polarization.

In one embodiment, the method further comprises: transmitting N successive PRIs at a first pulse repetition frequency (PRF) to form a first coherent processing interval (CPI); transmitting N successive PRIs at a second pulse repetition frequency (PRF) to form a second CPI; and transmitting N successive PRIs at a third pulse repetition frequency (PRF) to form a third CPI; wherein N is a positive integer greater than 1 and N for the first and second CPI may be different.

In another embodiment different CPI's can consist of multiple pulses like two long pulses of different polarization and/or frequencies and two short gap filler pulses with the same two polarizations but slightly different frequency to separate their echoes in the receiver from the long pulse echoes.

BRIEF DESCRIPTION OF THE DRAWINGS

The foregoing features may be more fully understood from the following description of the drawings in which.

DETAILED DESCRIPTION

Figure 1A:
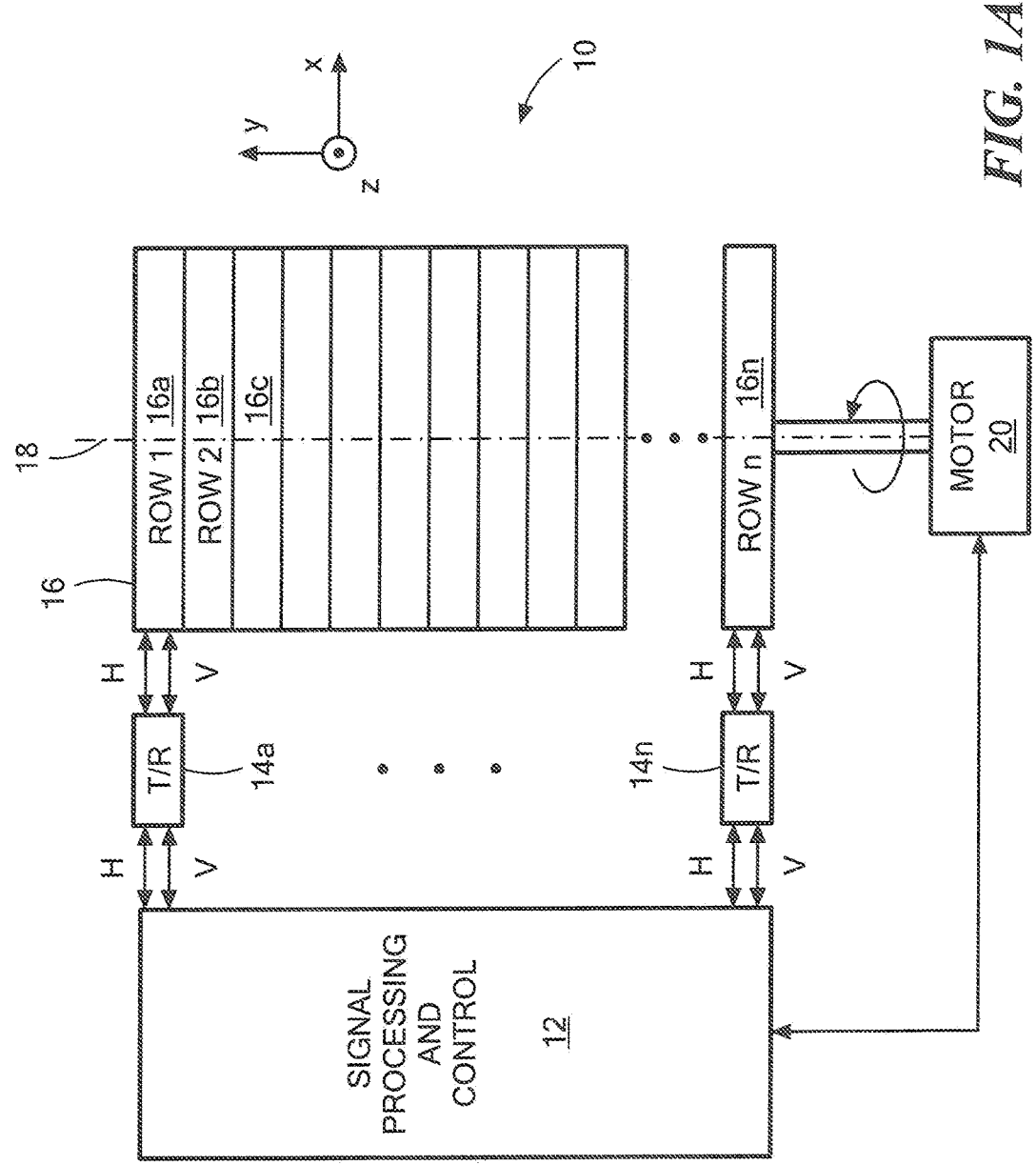
FIG. 1a is a block diagram illustrating an exemplary radar system architecture in accordance with an embodiment.

Subject matter described herein relates to novel radar system architectures, antenna systems that may be used with the architectures, and methods for operating radars having these architectures. In various embodiments, a rotating array antenna is used that includes multiple rows of radiating elements, where each row can be fed at one or two ports (i.e., one port if single polarization radiating elements are used and two ports if dual polarized radiating elements are used). This allows one transmit/receive (T/R) module to be used for each row of the array antenna. The rows of the array may display a waveguide-like dispersive quality that allows some degree of frequency scanning to be achieved in azimuth. Because the array antenna only needs a single T/R module per row, the total number of T/R modules required by the radar system to perform desired functions is significantly reduced compared to radars using conventional array antennas (which typically require one module per radiating element versus one module per row of the order of 40-100 radiating elements). There could be cases where more than one T/R module would be used and still we would require many fewer than for a full array. In addition, because the array rotates, a single array face may be used to achieve 360 degree coverage, rather than requiring multiple faces (although multi-face embodiments of the described architectures may also be used). As a result the system provides nearly the same flexibility and capability as a 3 or 4 faced full array system without its cost and complexity.

The radar system designs and architectures described herein are capable of achieving a desired performance level with lower development and production costs than traditional systems. Radar systems and techniques described herein are also scalable. In some implementations, high efficiency, low cost antenna row structures are used for the array antenna that are capable of providing high aperture efficiency, low loss, polarization diversity, and wide scan capabilities in a low cost design. In at least one embodiment, beam spoiling is used during a transmit mode to generate a shaped beam that covers the full or parts of the elevation range of interest of the radar system. Digital beam forming (DBF) techniques may be used during reception in some embodiments to generate a stack of focused narrow width beams covering the elevation range of interest. MLE techniques or similar techniques may be used to process the receive beam information to estimate, for example, a target elevation angle. In some implementations, the dispersive nature of the rows of the array antenna may be used to generate a stack of beams in azimuth. MLE techniques or similar techniques may also be used to process the azimuth beam echo signals to estimate azimuth angle. In some embodiments, the radar system will use its electronic scan back capability for target verification, track initiation of to acquire more information on a target. In some implementations, the radar architectures described herein are capable of removing range and Doppler ambiguity and also initiate track in a single pass. The radar architectures described herein allows operation near the principle plane, thus providing excellent cross polarization characteristics. This avoids the need for costly periodic and highly accurate polarization calibration of the antenna to achieve low cross polarization measurements. The radar architectures described herein may be used to support multiple different radar applications simultaneously in some implementations.

FIG. 1a is a block diagram illustrating an exemplary radar system architecture 10 in accordance with an embodiment. As shown, the radar system architecture 10 includes: a signal processing and control section 12, a plurality of transmit/receive (T/R) modules 14, and a dispersive array 16. As will be described in greater detail, the dispersive array 16 may include a plurality of rows 16a, ..., 16n of radiating elements, each row having waveguide-like dispersion qualities that allow frequency scanning to be achieved. Each row may include one or more transmission line structures that are used to feed corresponding radiating elements. The radiating elements may be coupled to the transmission line structure(s) at predetermined points along the line. In some embodiments, the radiating elements along a row may each have a single polarization orientation (e.g., all vertically polarized, all horizontally polarized, etc.). In other embodiments, dual polarized radiating elements may be used. In embodiments that use elements having a single polarization, rows of the array may have one feed port that is coupled to all radiating elements of the row. In dual polarization embodiments, each row of the array may have two ports (e.g., one of horizontal polarization and one for vertical polarization).

Figure 1B:
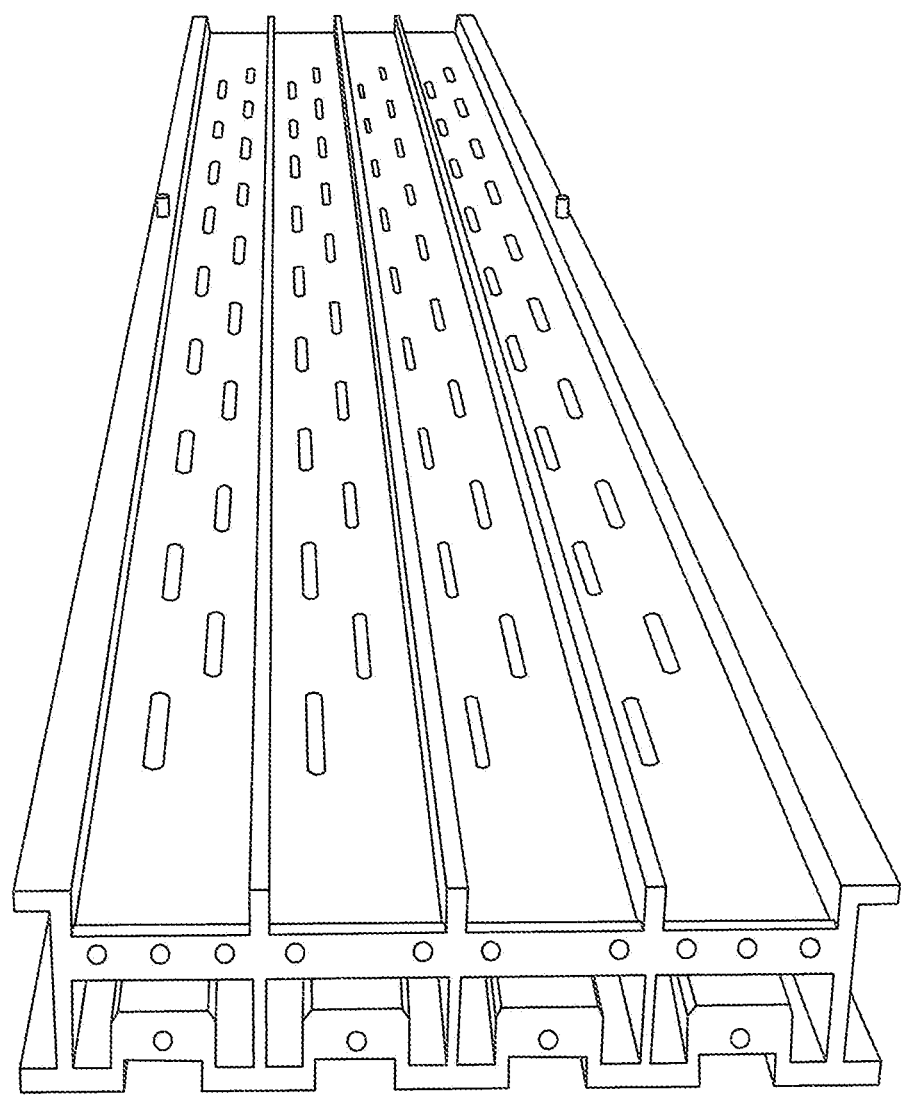
FIG. 1b shows one embodiment of a super-element dispersive antenna waveguide.

In different embodiments, different types of radiating elements may be used within the rows. In one embodiment the row radiating element includes a single polarized dispersive "super element", see FIGS. 1b and 1c which show an embodiment for a single polarization. In other embodiments, dual polarization is provided by super-elements. In another embodiment, for example, the radiating elements associated with a row may comprise slots in a sidewall or broadwall of a waveguide or other transmission structure, see for example FIG. 1d. Ridge waveguides could be used to get wide bandwidth. In some other embodiments, one or more radiating elements (e.g., patches, dipoles, Vivaldi notches, etc.) may be used that are fed by waveguide slots. Other types of elements may also be used, such as a leaky waveguide. In one exemplary implementation, 180 rows are provided in an array with 40 dual polarized radiating elements per row. It should be appreciated, however, that the number of rows and the number of elements per row may vary in different implementations.

In at least one embodiment, each row of the array 16 may be coupled to a single T/R module to provide both transmit and receive functions for the row. As shown in FIG. 1a, for example, row 16a may be coupled to T/R module 14a, and so on. As described previously, a separate port may be provided in each row 16a, ..., 16n of the array 16 for horizontal and vertical signals in some implementations. In these embodiments, the T/R modules 14a, ..., 14n may also have separate horizontal and vertical ports that can be coupled to the ports of the corresponding rows 16a, ..., 16n.

Each T/R module 14a, ..., 14n may also be coupled to the signal processing and control section 12. The signal processing and control section 12 may be operative for controlling the overall operation of the radar system 10. The signal processing and control section 12 may also be operative for generating transmit waveforms to be transmitted by the array 16 and for processing return signals received by the array 16. Although not illustrated in FIG. 1a, analog-to-digital and digital-to-analog conversion equipment and/or frequency conversion equipment may be provided between the T/R modules 14a, ..., 14n and the signal processing and control section 12 in some implementations.

The signal processing and control section 12 may be implemented using, for example, one or more digital processing devices. Any type of digital processing devices may be used. The digital processing device(s) may include, for example, one or more of the following: a general purpose microprocessor, a digital signal processor (DSP), a reduced instruction set computer (RISC), a complex instruction set computer (CISC), a field programmable gate array (FPGA), a programmed logic array (PLA), a microcontroller, an application specific integrated circuit (ASIC), a multi-core processor, a processor complex, and/or others. Although illustrated as part of a single unit in FIG. 1a, it should be appreciated that the control functionality and the signal processing functionality may be implemented separately in some embodiments (e.g., in different physical processors or processor complexes, etc.). In various embodiments, techniques and systems described herein may be implemented using any combination of hardware, software, and firmware.

During radar operation, the dispersive array 16 rotates about an axis 18 to achieve scanning in, for example, an azimuth direction. A motor 20 is provided to drive the rotation. In some embodiments, the dispersive array 16 may include a single array face. In other embodiments, two array faces may be provided back to back to reduce the time it takes to complete a full azimuth scan. In some embodiments, instead of a continual rotation in one direction in azimuth, a back and forth movement may be used. This may be done, for example, if less than the full 360 degrees of azimuth is of interest. In some embodiments the antenna may be stationary and the beam scanned in azimuth by changing the carrier frequency. In some embodiments, the dispersive array 16 may be mounted with a tilt back with respect to the axis of rotation to improve elevation coverage range, see for example, FIG. 1*f*.

Figure 1C:
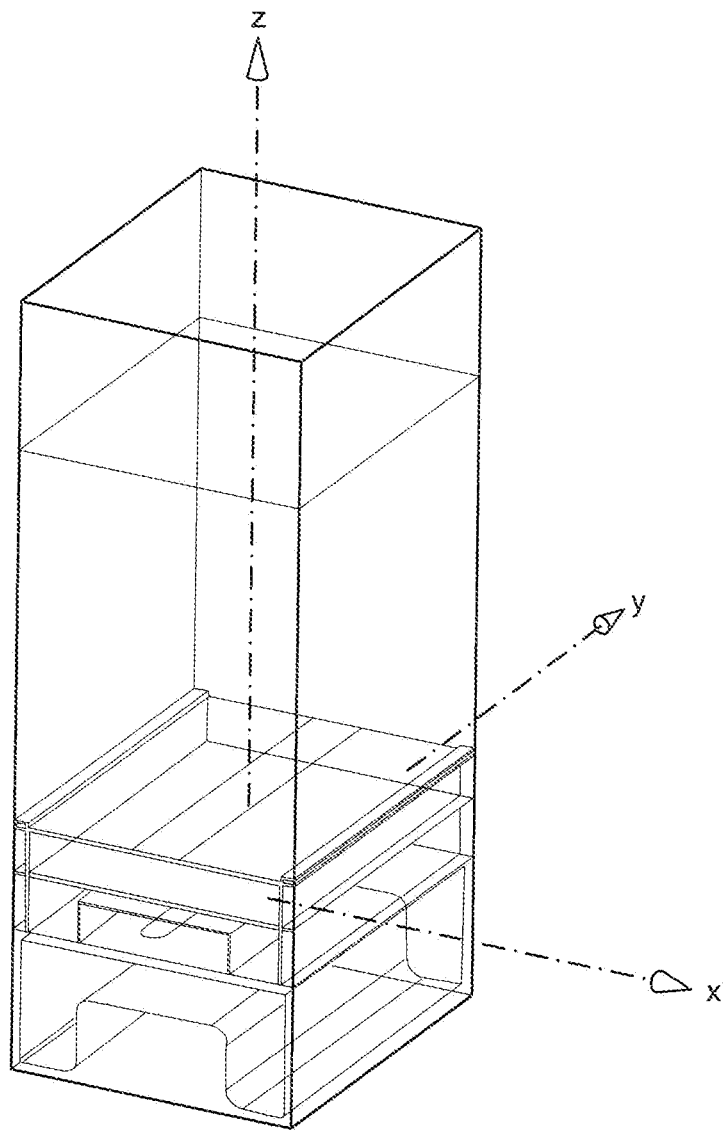
FIG. 1C shows a super-element stack up for a single unit cell that may be used as part of a dispersive array in accordance with an embodiment.

As indicated above the dispersive array 16 may be implemented in a variety of different manners. In some embodiments, the dispersive array 16 may include antenna structures called "super elements" such as those described in U.S. Pat. No. 8,866,686 B1, which is assigned to the assignee of the present application and is incorporated by reference herein in its entirety. For one polarization embodiment of the super-element it includes a ridge waveguide shown in FIG. 1*b* over which is placed a dielectric assembly shown in FIG. 1*c* for one antenna element unit cell. Each ridge waveguide row has conductive walls along its length which extend above the waveguide broadwall and encloses the dielectric assembly. The conductive walls form a slot radiator that runs the full length of the super-element. The dielectric assembly comprises two low loss foam dielectric sheets that run the length of the super-element (FIG. 1*c*). On each sheet is a conductive strip that runs the length of the super-element. The strips are over the broadwall longitudinally displaced offset waveguide slots. Such super-elements are capable of providing high aperture efficiency, low loss, polarization diversity, very low cross polarization and wide scan capabilities in a relatively low cost design. Illustrative super-elements are shown and described in U.S. Pat. No. 8,866,686 B1, which is incorporated herein by reference.

Figure 1D:
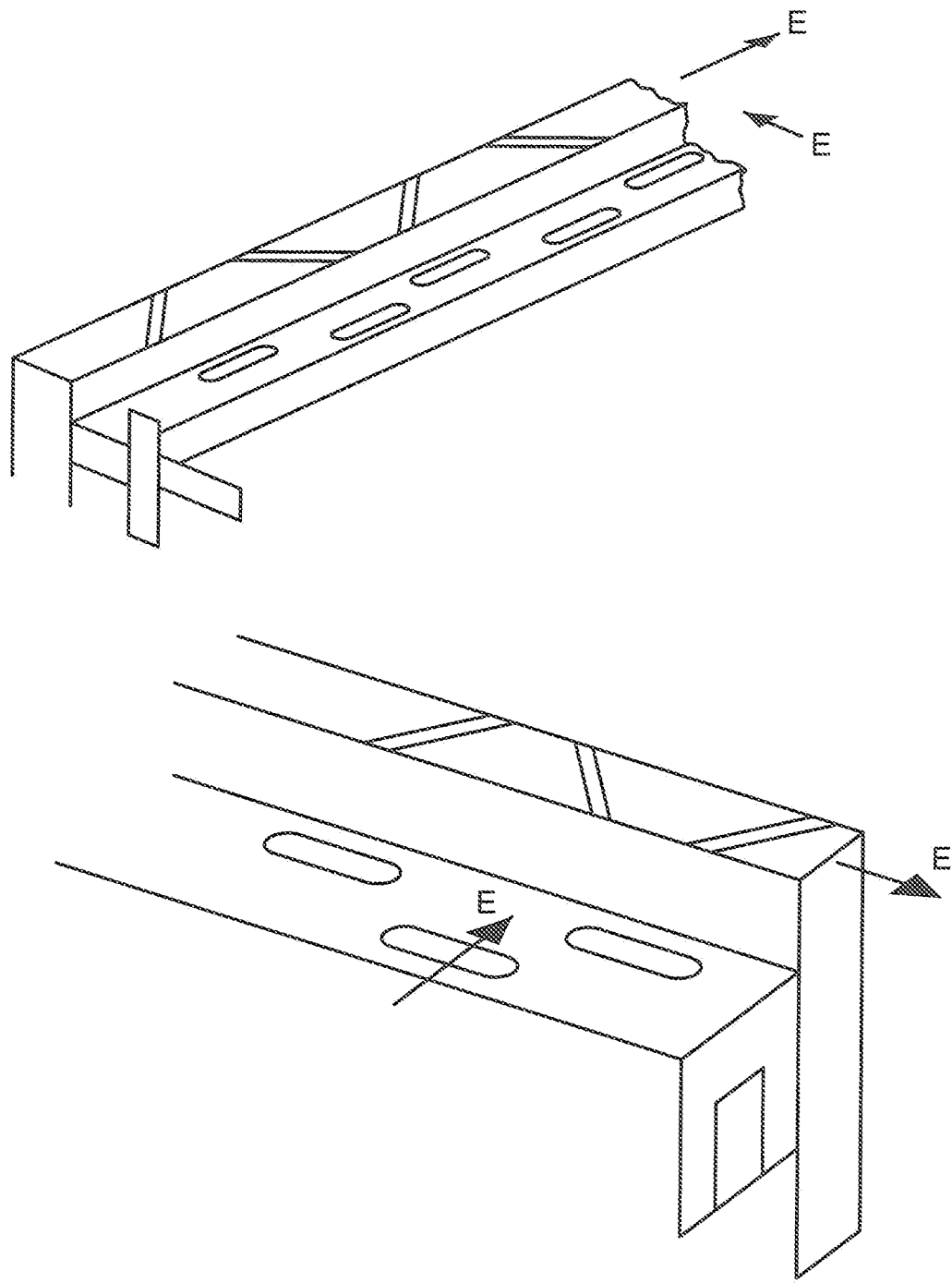
FIG. 1d is a standard slotted waveguide antenna that may be used as part of a dispersive array in accordance with an embodiment.

For lower cost the slotted ridge waveguide can be used without the super-element dielectric assembly and without the ridge as shown in FIG. 1*d*. The antenna is configured to provide dual linear polarization on H and V. This is done by interleaving rows of slotted waveguide that provide respectively H and V polarization as shown in FIG. 1*d*. With waveguide elements placed horizontally the V polarization is provided by the slotted waveguides having broadwall offset slots, see for example, FIGS. 1*b* and 1*d*. The H polarization is provided by the waveguides having slots along the waveguide edge; see FIG. 1*d*. Each waveguide will have a separate port that can be coupled to a corresponding T/R module H and V port, see for example, FIGS. 2 and 3.

For the slotted waveguide element it is possible to achieve slant 45° linear polarization by having the broadwall slots cut at a 45° angle. Alternately one can radiate simultaneously from the H and V elements to generate slant right or left 45° polarizations. For the dual polarized configuration of FIG. 1*d* one of the two waveguides may have slots that radiate with a first polarization orientation and the other waveguide may have slots that radiate in a second, orthogonal polarization orientation. Each slot in the first waveguide may have a corresponding slot in the second waveguide. Each waveguide may have a separate port that can be coupled to a corresponding T/R module, see for example FIGS. 2 and 3.

Figure 1E:
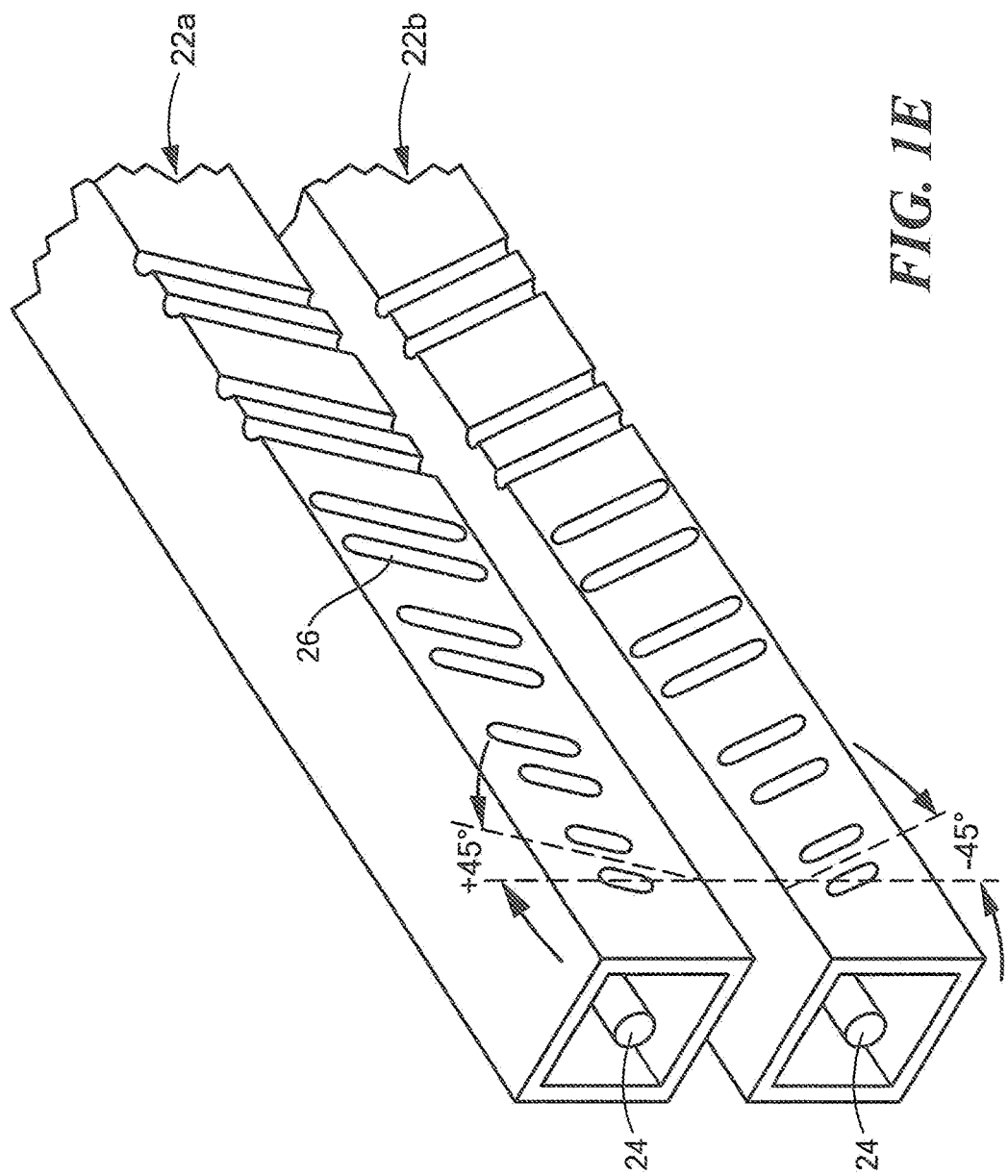
FIG. 1e is a diagram illustrating a dual slotted square coaxial line structure that may be used as part of a dispersive array in accordance with an embodiment.

In still another embodiment, each row of the array may include a dual slotted square coaxial line array, as shown in FIG. 1*e*. As shown, each row may include two side by side coaxial lines 22*a*, 22*b*. Each coaxial line 22*a*, 22*b* may include a rigid, square outer conductor 24 and a rigid center conductor 26. Slots 28 may be formed in the outer conductors 24 of the coaxial lines for use as non-resonant slot radiators. The slots 28 of the first coaxial line 22*a* may be orthogonal to the slots 28 of the second coaxial line 22*b*. The center conductors 26 may be held in place using, for example, a solid dielectric material or an extruded helical dielectric material (e.g., polyethylene, etc.).

The radar system architecture 10 of FIG. 1*a* may be used in a wide variety of different applications. In addition, in some implementations, the architecture 10 may be used to provide multiple radar applications concurrently (e.g., an air traffic control radar and a weather radar, etc.). In at least one implementation, the architecture 10 may be used in a search radar to search for targets associated with a particular application (e.g., airplanes in an air traffic control system, etc.). The array 16 will rotate about its axis 18 to scan in azimuth. Electronic scanning may be used to scan in elevation. In at one approach, phase spoiling may be used during transmit to generate a single large width shaped beam that covers the entire (or a large portion of the) elevation range of interest. In one exemplary air traffic control (ATC) related implementation, the elevation range of interest is 37 degrees wide. As will be appreciated, other ranges may be used in other implementations.

Figure 4:
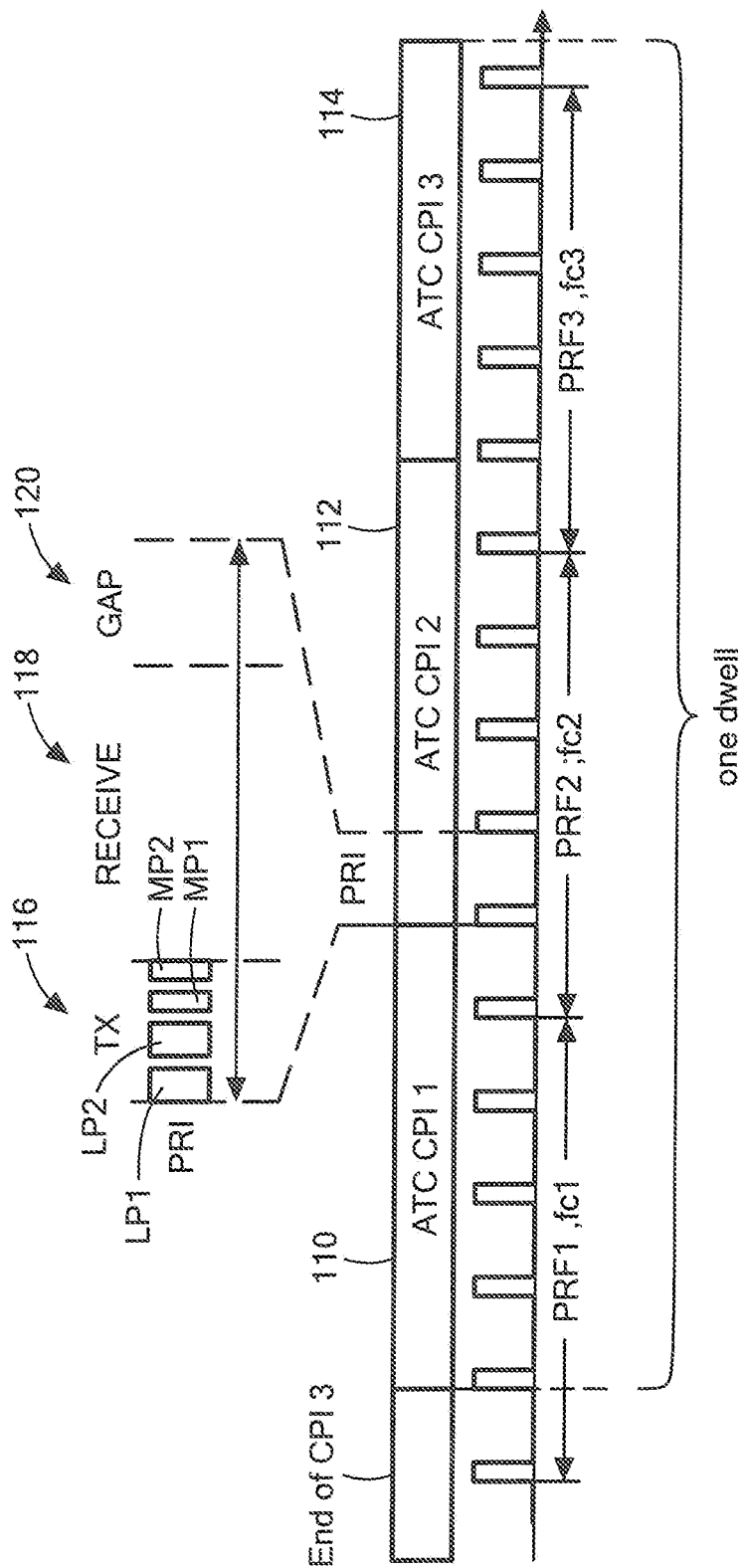
FIG. 4 is a waveform illustrating multiple CPIs within a dwell time of a radar system in accordance with an embodiment for terminal or en route ATC or for air surveillance.
Figure 6:
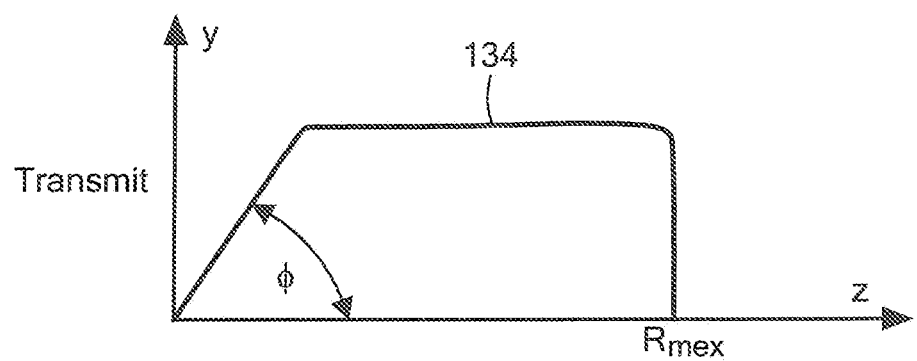
FIG. 6 is a diagram illustrating a shaped spoiled transmit beam that may be used to cover an entire elevation angle range of interest or a large part of it in accordance with an embodiment.

FIG. 4 shows an example waveform of multiple CPIs comprising multiple pulsed at different RF frequencies and PRI for each CPI used for ATC or air surveillance. For the ATC application a spoiled beam on transmit that covers the whole or part of the elevation region of interest may be used, see FIG. 6.

In the example waveform implementation illustrated in FIG. 4, the radar parameters are configured so that there are 15 pulse repetition intervals (PRI5) per dwell time. As is known, the dwell time is the time that the radar signal will remain on the target per scan interval (e.g., per revolution of the dispersive array 16 of FIG. 1*a*). The 15 PRIs may be separated into three successive coherent processing intervals (CPIs) 110, 112, 114, as shown in FIG. 4. A different pulse repetition frequency (PRF) may be used for each of the CPIs 110, 112, 114. Each pulse repetition interval (PRI) may be divided into a transmit portion 116, a receive portion 118, and a gap portion 120. During the transmit portion 116, the radar will be in transmit mode and one or more pulses will be transmitted from the dispersive array. As described previously, in some embodiments, beam spoiling may be used to transmit pulses using wide unfocused beams that cover the entire elevation range (or a large portion of the elevation range) of the corresponding radar system. The different PRFs of the three CPIs 110, 112, 114 may be used for, for example, Doppler and/or range ambiguities reduction or removal. It should be understood that, as used herein, the terms "Pulse Repetition Interval," PRI, "Pulse Repetition Frequency," and PRF correspond to the repetition of the pulses within a CPI.

For the ATC implementation shown in FIG. 4 for each PRI four pulses are shown to be transmitted, for example, two long pulses, LP1 and LP2, and two medium pulses, MP1 and MP2. MP1 and MP2 are gap filler pulses for respectively LP1 and LP2. The long pulses are separated in frequency so as to provide frequency diversity for their echoes from an aircraft target with an illustrative separation of 10 MHz. A medium pulse and its respective long pulse are separated enough in frequency so that they do not interfere with each other in the receiver, like about 5 MHz for 1 MHz wide waveforms. Each of the 3 sets of 5 long and short pulses represent a pulse doppler waveform. In the waveform embodiment described above, frequency diversity is used. In some embodiments, polarization diversity may also or alternatively be used.

Figure 7:
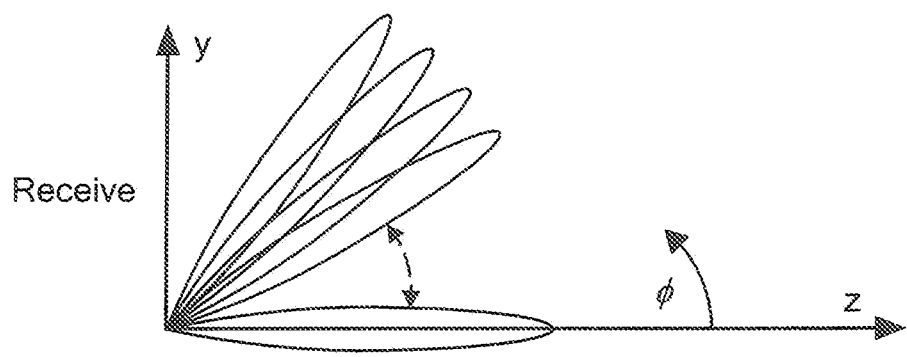
FIG. 7 is a diagram illustrating a stack of overlapping receive beams focused in elevation that may be generated using digital beam forming in accordance with an embodiment.

For the above exemplary ATC application digital beam forming (DBF) techniques may be used during receive to form a stack of focused narrow width focused beams. Focused beams are used because they provide elevation angle information and maximum signal-to-noise ratio (SNR). The stack of receive beams may collectively cover the entire elevation range of interest (e.g., the 37 degree range described above, etc.; see FIG. 7). The use of DBF allows all desired elevation angles to be processed during a single target dwell time (41 ms in one embodiment). This enables moving target detection (MTD) processing techniques to be used with the stacked beams in the rotating system. Any type of MTD processing may be used. One such processing technique is described in U.S. Pat. No. 7,741,992 to Wang, which is hereby incorporated by reference herein in its entirety.

Figure 1F:
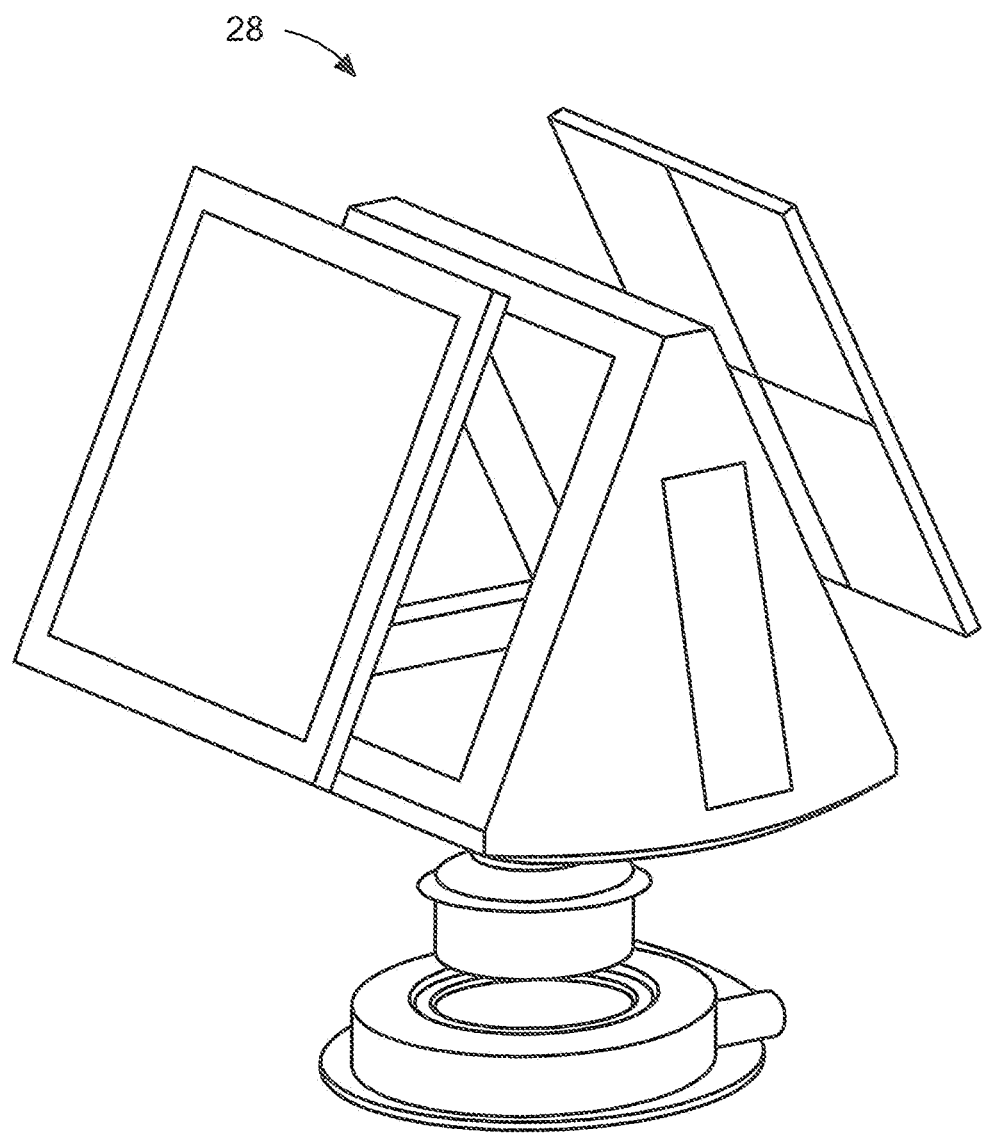
FIG. 1f shows an embodiment having back to back antennas.

In one exemplary implementation, a stack of receive beams is used with a 4 dB two-way crossover to cover the elevation range. In another exemplary implementation designed to reduce beam shape loss (BSL), twice as many beams are formed (i.e., 108 beams) with cross over points at 1 dB. This implementation results in a reduction in receive BSL. As will be appreciated, the number of receive beams used may vary. In at least one implementation, a dispersive array 16 is used, the super-element, that is capable of scanning up to ±76 degrees in elevation from broadside. As described previously, in some embodiments, dispersive array 16 may be mounted upon the axis of rotation with a slight tilt back to improve the elevation coverage range. In one exemplary implementation, a 14° tilt back is used to achieve elevation coverage from −10° to 90° (and possibly greater angle) in elevation for a weather radar. FIG. 1f shows an exemplary dual-face array antenna 28 on a rotating mount, where each face of the antenna has a 14° degree tilt back in accordance with an embodiment.

In some embodiments, MLE techniques may be used during reception for target detection and/or elevation angle estimation. It has been shown that MLE techniques are capable of achieving 40% or better angle accuracy during search over other techniques such as, for example, monopulse. Other estimation techniques may alternatively be used.

Figure 8:
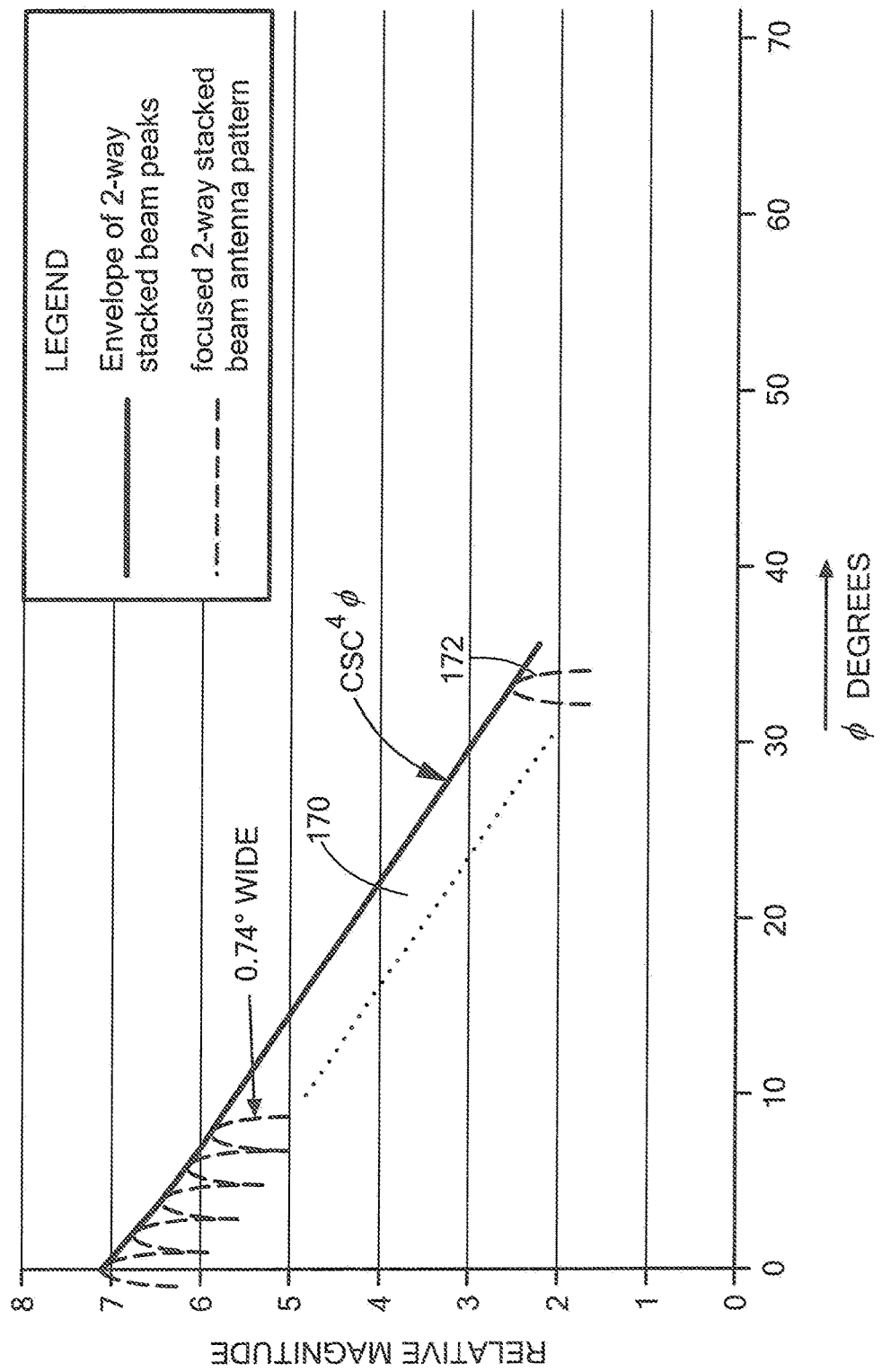
FIG. 8 is a plot illustrating an example two-way antenna transmit-receive patterns versus elevation angle in accordance with an embodiment for ATC or air surveillance.

FIG. 8 is a plot illustrating an exemplary antenna 2-way elevation transmit-receive pattern in accordance with an ATC embodiment. As shown, the envelope of the two-way transmit-receive pattern 170 will possibly in one implementation follow approximately a $csc^4 (\varphi)$ pattern in elevation angle $\varphi$ to provide a constant target SNR with range for a target approaching at a constant altitude. The transmit-receive pattern 172 includes a stack of focused receive beams that are each 0.74 degrees wide and 0.37 degree apart to achieve a lower BSL. The receive beams being focused will have their beam peaks fall off approximately as $cos (\varphi)$ if the antenna tilt is small while the transmit pattern falls off approximately as $cos^3 (\varphi)$ to give approximately a two-way of $cos^4 (\varphi)$.

One feature of illustrative radar embodiments described herein is the use of multiple applications simultaneously. For example it can be used for the weather mode while doing the ATC mode described above if desired. In this case, the waveform in FIG. 5 can be used. The first 3 CPIs are for the ATC mode and are as described for FIG. 4. These 3 CPIs use a spoiled beam on transmit that covers the whole elevation region as described above.

Figure 5:
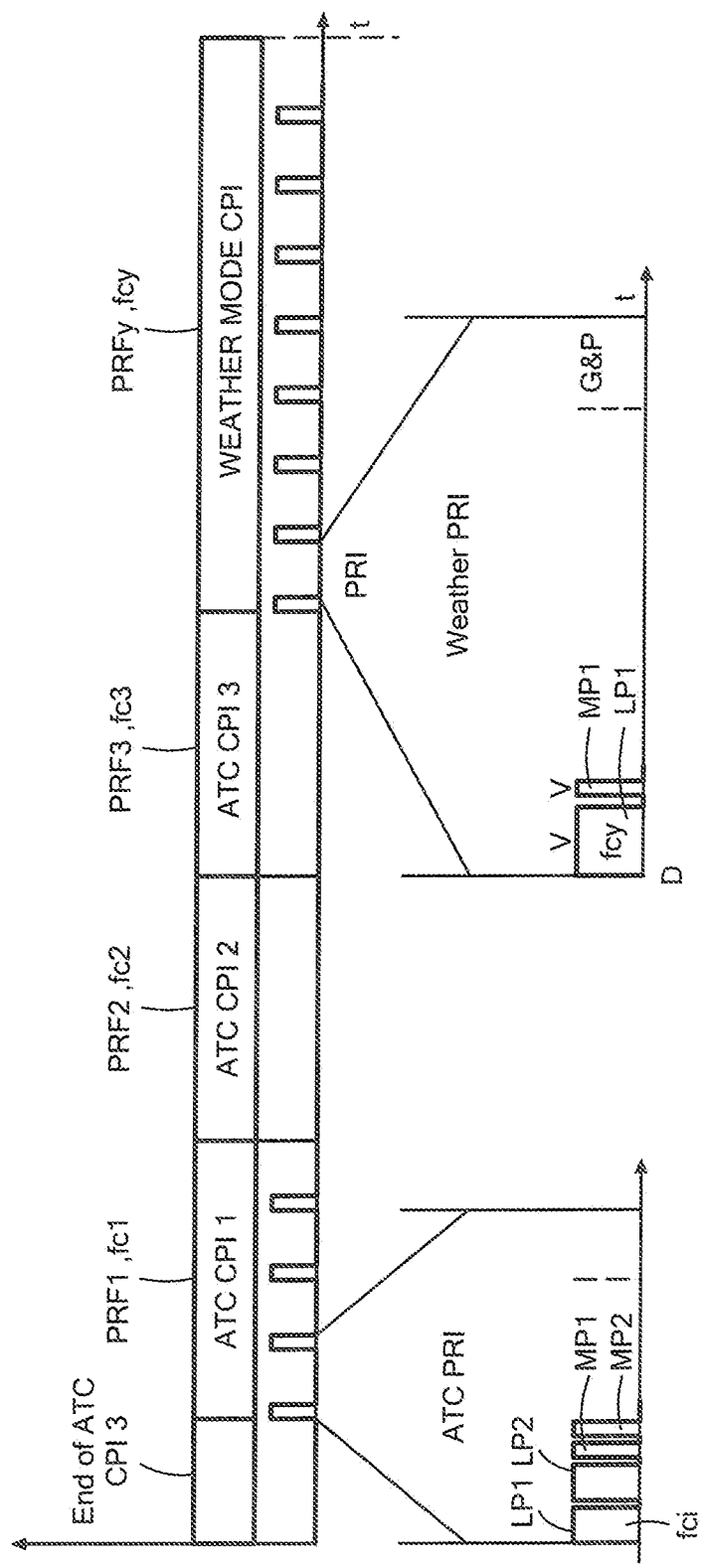
FIG. 5 shows a waveform transmission that may be used for a dual mode application for simultaneous ATC/air surveillance plus weather monitoring.

In the example waveform implementation illustrated in FIG. 5, for the weather mode the $4^{th}$ CPI, the radar parameters are configured so that there are 8 pulse repetition intervals (PRIs) per dwell time. Within each PRI is a long pulse, LP1, and gap filler medium pulse, MP1. These pulses could be vertically or horizontally polarized in a CPI (or left or right circular polarized). Whereas for the ATC waveforms the transmit beam is spoiled in elevation to cover all elevation angles of interest, for the weather mode the transmit beam could be focused in elevation to achieve higher sensitivity as is often needed for this mode. Alternately at times the beam could be defocused a small or large amount to cover wider elevation angles in a shorter time. The system is flexible enough to generate multiple weather transmit focused and defocuses elevation beams to cover widely separated regions if needed. Also it could at times use a spoiled beam that covers the whole elevation angle of interest which could be from −10° to +90° in elevation. Alternately at times it can scan a focused beam over this angle. The carrier frequencies of the 8 LPI weather pulses may differ from that of the ATC pulses so that they can be separated in the receiver. The same is true for the 8 MPI pulses which are all at the same frequency but which is different from the LPI pulses for separation in the receiver. Other waveforms could be used for the weather than the 8 pulse doppler waveform depicted in FIG. 5. For example a single long pulse followed by one or more shorter gap filler pulses could be used.

Referring again to FIG. 2, a schematic diagram illustrating an exemplary radar T/R module system 30 in accordance with an embodiment is shown. The radar system 30 is an example of a radar system that uses the system architecture 10 of FIG. 1a. The system 30 includes a plurality of T/R modules 34a, . . . , 34n that are coupled to corresponding rows 36a, . . . , 36n of a dispersive antenna array. Each T/R module 34a, . . . , 34n is also coupled to a signal processing unit 38 via a pair of analog-to-digital (A/D) converters 40a, 42a, . . . , 40n, 42n and a digital-to-analog converter (DAC) 44a, . . . , 44n. Frequency conversion operations (i.e., up and down conversion) may be performed digitally within signal processing unit 38 in some implementations. The A/D converters 40a, 42a, . . . , 40n, 42n may each include any type of device or subsystem that is capable of performing analog to digital conversion at a corresponding frequency. Likewise, the DACs 44a, 44n may each include any type of device or subsystem that is capable of performing digital to analog conversion at the desired frequency.

Figure 2:
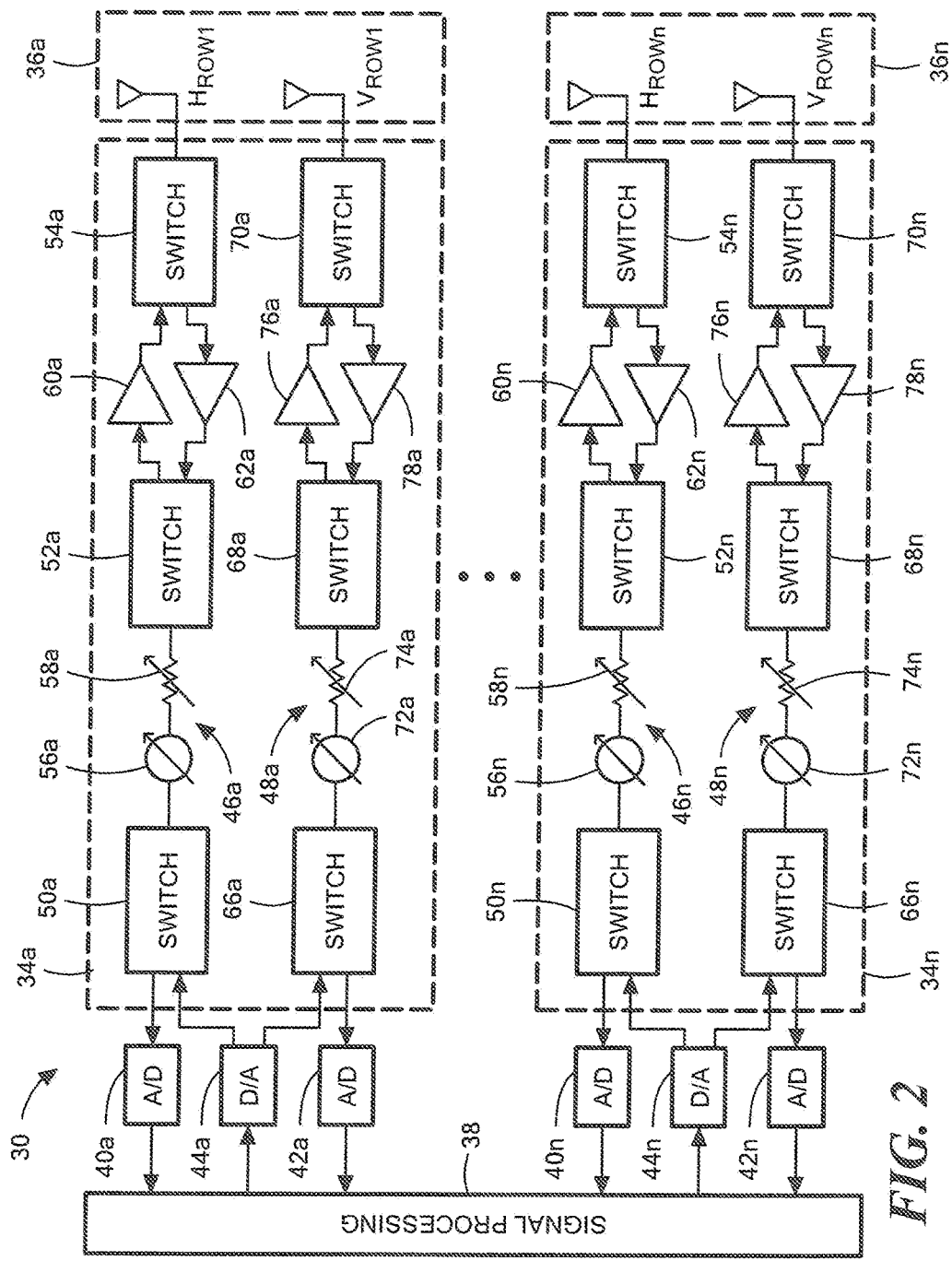
FIG. 2 is a schematic diagram illustrating an exemplary radar system in accordance with an embodiment.
Figure 3:
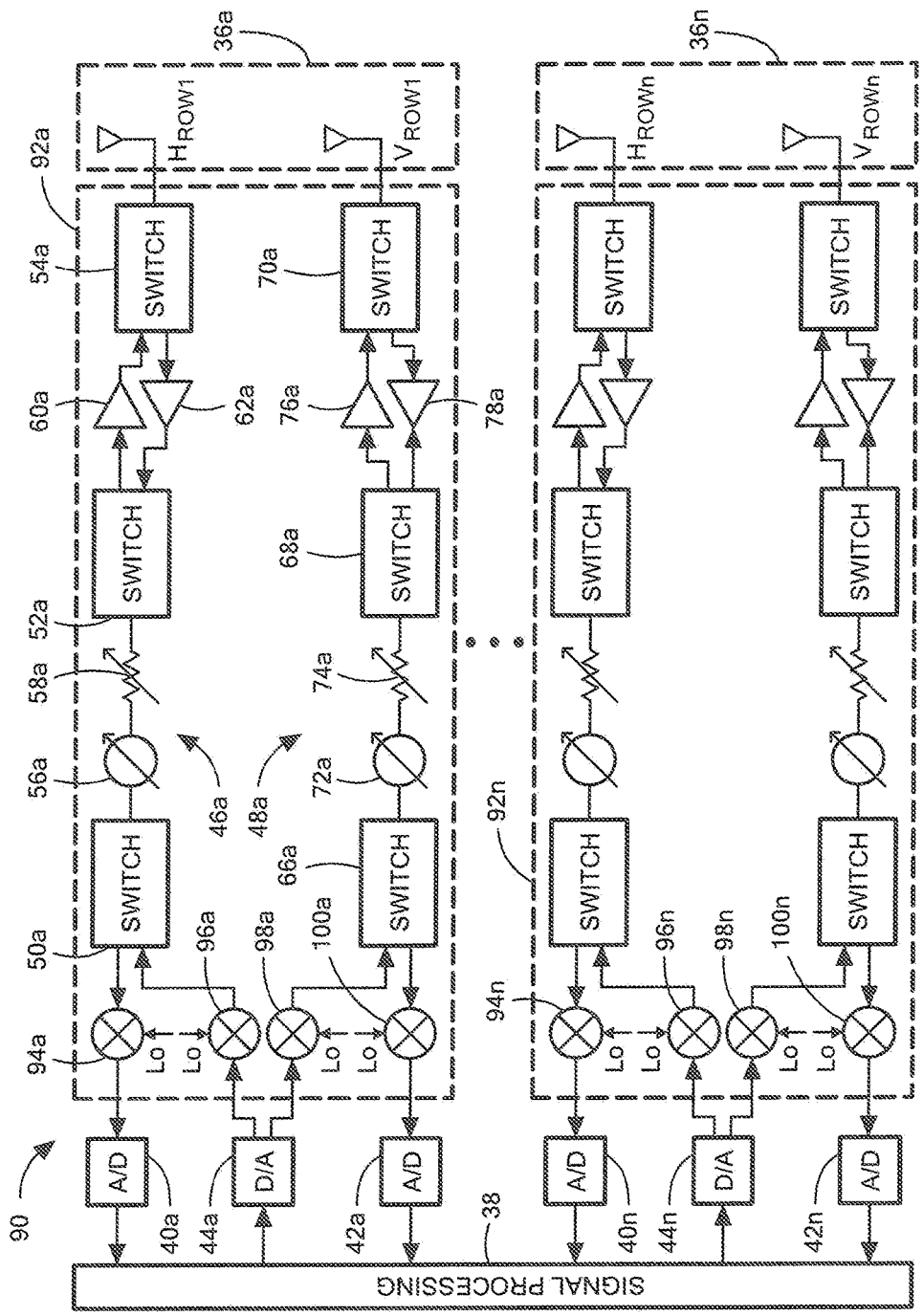
FIG. 3 is a schematic diagram illustrating another exemplary radar system in accordance with an embodiment.

As shown in FIG. 2, each T/R modules 34a, . . . , 34n may include a separate T/R channel for horizontal and vertical polarization. For example, T/R module 34a may include a horizontal channel 46a for horizontal polarization and a vertical channel 48a for vertical polarization. The horizontal channel 46a may be coupled to the horizontal polarization port of the corresponding row 36a of the array and the vertical channel 48a may be coupled to the vertical polarization port of row 36a of the array. Likewise, T/R module 34n may include a horizontal channel 46n for horizontal polarization and a vertical channel 48n for vertical polarization. The horizontal channel 46n may be coupled to the horizontal polarization port of the corresponding row 36n of the array and the vertical channel 48n may be coupled to the vertical polarization input of row 36n of the array.

The horizontal channel 46a of T/R module 34a may include: first, second, and third switches 50a, 52a, 54a; a phase shifter 56a; a variable attenuator 58a; a power amplifier 60a; and a low noise amplifier (LNA) 62a. Likewise, the vertical channel 48a of T/R module 34a may include: first, second, and third switches 66a, 68a, 70a; a phase shifter 72a; a variable attenuator 74a; a power amplifier 76a; and an LNA 78a. The switches 50a, 52a, 54a, 66a, 68a, 70a may be used by a controller to switch the T/R module 34a between transmit and receive modes. Referring now to horizontal channel 46a of T/R module 34a, during transmit mode, switch 50a may connect an output of DAC 44a to the phase shifter 56a, switch 52a may connect variable attenuator 58a to the input of power amplifier 60a, and switch 54a may connect the output of power amplifier 60a to the horizontal port of row 36a. In this manner, a transmit signal generated by the signal processing unit 38 may be processed by the DAC 44a, the phase shifter 56a, variable attenuator 58a, and power amplifier 60a before being transmitted from row 36a of the array antenna. Similarly, during receive mode, switch 54a may connect the horizontal port of row 36a to the input of LNA 62a, switch 52a may connect the output of LNA 62a to variable attenuator 58a, and switch 50a may connect the phase shifter 56a to the input of A/D converter 40a. In this manner, a receive signal received by the row 36a of the array antenna may be processed by the LNA 62a, the variable attenuator 58a, the phase shifter 56a, and the A/D converter 40a before being input to signal processing unit 38 for processing. A similar process may take place within the vertical channel 48a of T/R module 34a and in the horizontal and vertical channels of the other T/R modules in the radar system 30. The phase shifters 56a,n, 72a,n, the variable attenuators 58a,n, 74a,n, and the switches 50a,n, 52a,n, 54a,n, 66a,n, 68a,n, 70a,n may be controlled by the signal processing unit 38 or another controller.

Referring again to FIG. 2, the phase shifters 56a, 72a of the T/R module 34a may be used to set the relative phase between the horizontal and vertical signals associated with row 36a. To achieve slant linear polarization, for example, the phase shifters 56a, 72a may be set to achieve the same phase for the horizontal and vertical signals of row 36a. The slant polarization may be slant right (SR) polarization or slant left (SL) polarization. To achieve circular polarization, the phase shifters 56a, 72a may be set to achieve a 90 degree phase difference between the horizontal and vertical signals of row 36a. A similar phase arrangement may be formed within each of the other T/R modules in the system 30. The variable attenuators 58a, 74a may be used to adjust the relative magnitude of the horizontal and vertical signals of row 36a. For example, to achieve elliptical polarization, instead of circular, the variable attenuators 58a, 74a may be set to different attenuation values while the phase shifters are set to a 90 degree phase difference.

It should be appreciated that the architectures of the T/R modules 34a, . . . , 34n shown in FIG. 2 represent one possible architecture that may be used in the systems and methods described herein. Many alternatives may be used. For example, one or more of the switches 50a, 52a, 54a, 66a, 68a, 70a may be replaced with other duplexer structures (e.g., a circulator, etc.) in some embodiments. Also, in some embodiments, the power amplifiers 60a, . . . n, 76a, . . . n, may each have variable gain that can be adjusted by a controller or other processor. In addition, although illustrated as separate from the T/R modules 34a, . . . , 34n in FIG. 2, it should be appreciated that the A/D converters 40a, . . . , 40n, 42a, . . . , 42n and the DACs 44a, . . . , 44n may be part of the corresponding T/R modules 34a, . . . , 34n in some implementations. In some implementations only one polarization may be needed on receive at one time. Other modifications or alternatives may also be used.

Referring again to FIG. 3 a schematic diagram illustrating an exemplary radar system 90 in accordance with an embodiment is shown. The system 90 is similar to the system 30 of FIG. 2, with the addition of analog frequency conversion functionality within the T/R modules 92a, . . . , 92n. For example, with reference to T/R module 92a of FIG. 3, a downconverter 94a is placed between switch 50a and A/D converter 40a and a downconverter 100a is placed between switch 66a and A/D converter 42a in system 90. Similarly, an upconverter 96a is placed between DAC 44a and switch 50a and an upconverter 98a is placed between DAC 44a and switch 66a in system 90. One or more variable frequency oscillators may also be provided for generating local oscillator (LO) signals for the frequency conversion units. Although shown within the T/R modules 92a, . . . , 92n, it should be appreciated that this analog frequency conversion functionality may also be provided external to the modules 92a, . . . , 92n in some implementations.

As indicated the formation of multiple receive focused receive beams using DBF enables one to do during one scan multifunctions such as ATC and weather modes simultaneously as described above, as well as MTD. There are other ways to generate multiple beams in elevation to achieve the same capability in other applications. For example one could use a Rotman lens connected to the horizontal dispersive row radiating elements of 16 to form multiple spoiled and/or focused receive and transmit beams. For such an implementation T/R modules would be placed between the Rotman lens and the row dispersive elements. The A/Ds and D/As would not be in these T/R modules but instead in T/R module between the Rotman lens and the receiver/exciters ports feeding the lens.

An alternate configuration to that of FIG. 1a allows the system to receive signals by the antenna while at the same time transmitting a signal at the same or a different frequency. To do this the array of FIG. 1a is split in two about the vertical center line with one half used for transmit and the other half used for receive. A septum might be used for better isolation between the transmit and receive signals. For such a configuration the T/R module would be split in two with on half, the T halves, being used to feed the transmit dispersive row elements and the receive half, the R halves, being used to receive the receive dispersive row element signals.

Figure 9:
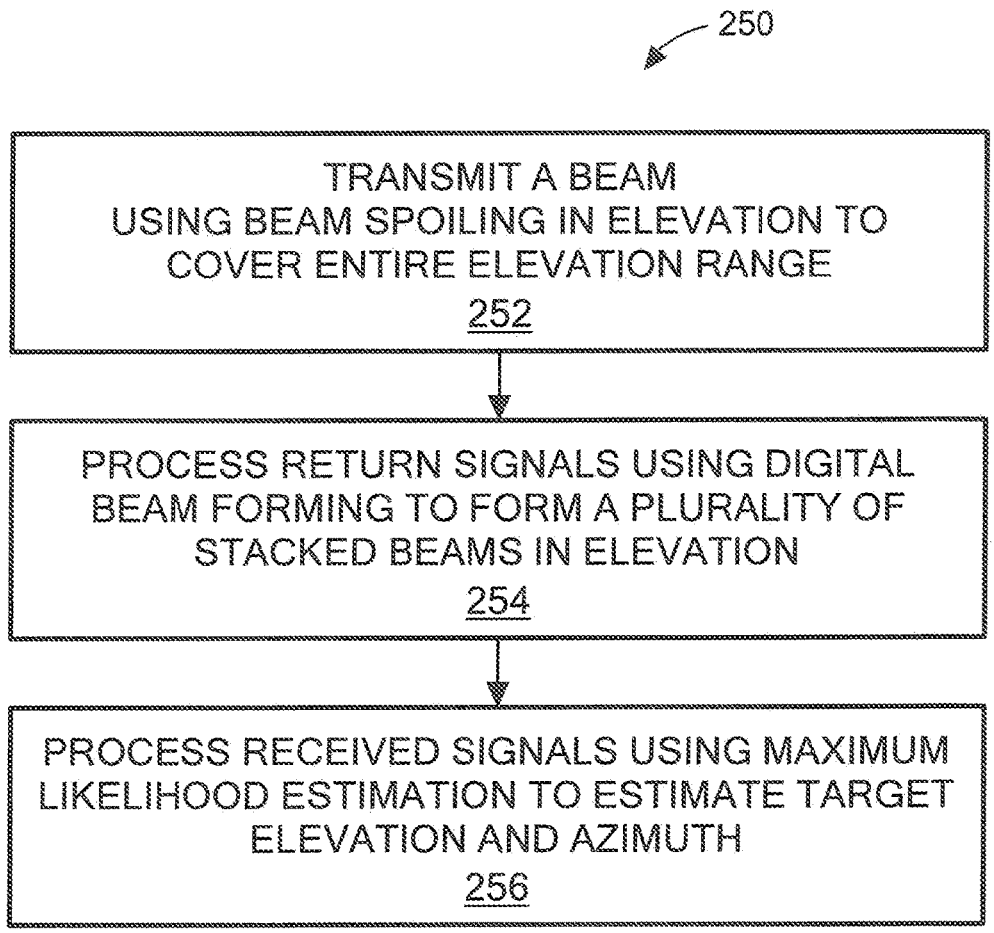
FIG. 9 is a flow diagram illustrating a process for operating a radar system in accordance with an embodiment.

FIG. 9 is a flow diagram illustrating a process for operating a radar system that uses a dispersive antenna in accordance with an embodiment. The rectangular elements (typified by element 252 in FIG. 9) are herein denoted "processing blocks" and may represent computer software instructions or groups of instructions. It should be noted that the flow diagram of FIG. 9 represents one exemplary embodiment of a design described herein and variations in such a diagram, which generally follow the process outlined, are considered to be within the scope of the concepts, systems and techniques described and claimed herein.

Alternatively, the processing blocks may represent operations performed by functionally equivalent circuits such as a digital signal processor circuit, an application specific integrated circuit (ASIC), or a field programmable gate array (FPGA). Some processing blocks may be manually performed while other processing blocks may be performed by a processor. The flow diagram does not depict the syntax of any particular programming language. Rather, the flow diagram illustrates the functional information one of ordinary skill in the art requires to fabricate circuits and/or to generate computer software to perform the required processing. It should be noted that many routine program elements, such as initialization of loops and variables and the use of temporary variables may not be shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described below are unordered meaning that, when possible, the sequences can be performed in any convenient or desirable order.

Referring now to FIG. 9, a beam may first be transmitted possibly using beam spoiling in elevation to cover an entire elevation range of interest (block 252). Return energy may then be processed using digital beam forming (DBF) to form a plurality of stacked beams in elevation (block 254). Maximum likelihood estimation (MLE) processing may then be used to process the received information to estimate the elevation or azimuth angle of a target (block 256).

As used herein, the phrase "configured to" and similar phrases are intended to include a device, system, or structure that is specially adapted to perform a particular task or function. This may include, for example, an electrical circuit that is designed to perform a task or function. It may also include, for example, a reconfigurable hardware unit (e.g., an FPGA, a PLA, etc.) that is configured with configuration data to perform a task or function. It may further include, for example, a programmed or programmable processor or processors that have associated software to perform a task or function. As such, a reconfigurable or programmable unit is considered "configured to" perform a task or function if it has access to a memory or storage device having configuration data or software that is capable of carrying out the task or function when loaded into the reconfigurable or programmable unit.

Figure 10:
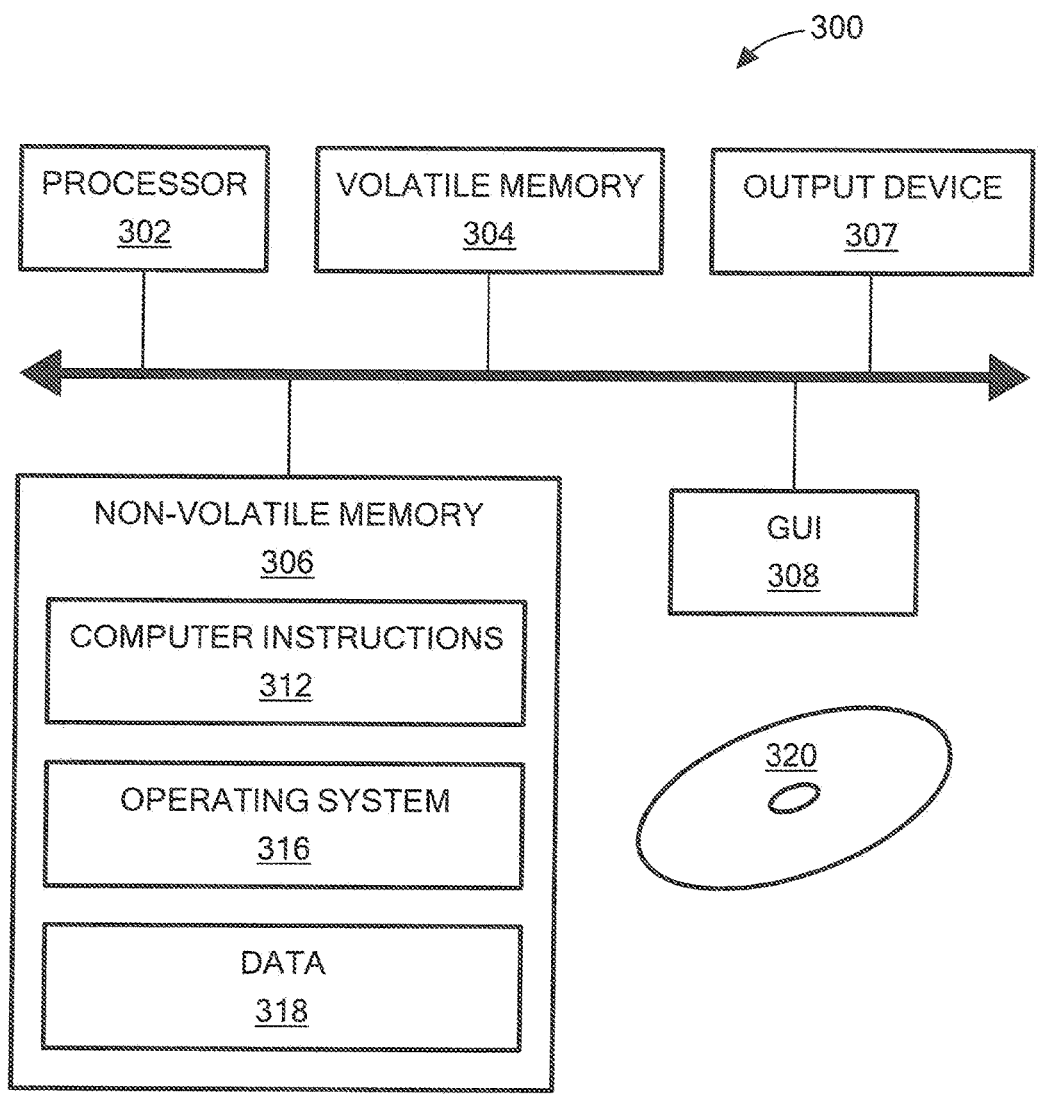
FIG. 10 is a schematic representation of an illustrative computer than can perform at least a portion of the processing described herein.

FIG. 10 shows an exemplary computer 300 that can perform at least part of the processing described herein. The computer 300 includes a processor 302, a volatile memory 304, a non-volatile memory 306 (e.g., hard disk), an output device 307 and a graphical user interface (GUI) 308 (e.g., a mouse, a keyboard, a display, for example). The non-volatile memory 306 stores computer instructions 312, an operating system 316 and data 318. In one example, the computer instructions 312 are executed by the processor 302 out of volatile memory 304. In one embodiment, an article 320 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A radio frequency (RF) system comprising:
an array antenna having a plurality of rows of radiating elements, wherein at least some of the rows have dispersive qualities that allow frequency scanning to be used with the row;
a plurality of transmit/receive (T/R) modules, wherein only a single T/R module of the plurality of T/R modules is coupled to each row of radiating elements; and
one or more digital processors coupled to the plurality of T/R modules to generate waveforms to be transmitted from the array antenna and to process return signals received by the array antenna, the one or more processors configured to:
generate a recurring radar waveform having at least a transmit portion and a receive portion, the transmit portion having multiple successive pulses at different RF frequencies to cause transmit beams to be generated by the array antenna at different azimuth angles, the recurring radar waveform having a pulse repetition frequency (PRF);
process return signals associated with the recurring radar waveform using digital beam forming (DBF) to generate a stack of receive beams in elevation; and
process data associated with the stack of receive beams using maximum likelihood estimation (MLE) to estimate target elevation and azimuth angles.

2. The RF system of claim 1, wherein the one or more processors are configured to:
generate multiple successive radar waveforms at a first pulse repetition frequency (PRF) to form a first coherent processing interval (CPI);
generate multiple successive radar waveforms at a second PRF to form a second CPI, the second PRF being different from the first PRF; and
process return data received during at least the first and second CPIs using MLE to generate an estimate of target azimuth angle, wherein the different PRFs associated with the first and second CPIs are used to reduce Doppler ambiguity.

3. The RF system of claim 2, wherein the one or more processors are configured to:
generate multiple successive radar waveforms at a third PRF to form a third CPI, the third PRF being different from the first and second PRFs; and
process return data received during at least the first, second, and third CPIs using MLE to generate an estimate of target azimuth angle, wherein the different PRFs associated with the first, second, and third CPIs are used to reduce Doppler ambiguity.

4. The RF system of claim 2, wherein:
the number of successive radar waveforms generated for each PRF is based at least in part on the dwell time of the radar, antenna rotation rate, the azimuth beamwidth, and the carrier frequencies use for the CPIs.

5. The system of claim 1, wherein:
the one or more digital processors are configured to process return data associated with the transmit beams at different azimuth angles using MLE to generate an estimate of target azimuth angle.

6. The system of claim 1, wherein:
a first row of the array antenna includes dual polarized radiating elements, the first row having a first port associated with the first antenna polarization and a second port associated with the second orthogonal antenna polarization.

7. The system of claim 6, wherein:
each T/R module includes a first T/R module port coupled to the first port of the first row of the array antenna and a second T/R module port coupled to the second port of the first row of the array antenna;
the first T/R module port and the first port correspond to RF signals having the first antenna polarization; and
the second T/R module port and the second port correspond to RF signals having the second orthogonal antenna polarization.

8. The system of claim 1, wherein the one or more digital processors are configured to:
generate the recurring radar waveform to include a first pulse at a first RF frequency that causes a first transmit beam to be generated by the array antenna at a first azimuth angle and a second pulse at a second RF frequency that causes a second transmit beam to be generated by the array antenna at a second azimuth angle; and
change the pulse repetition frequency of the recurring radar waveform based, at least in part, on a dwell time associated with the array antenna.

9. The system of claim 1, wherein the one or more digital processors are configured to:
generate the recurring radar waveform to include a first plurality of transmit pulses associated with a first radar application and a second plurality of transmit pulses associated with a second radar application that is different from the first radar application.

10. The system of claim 9, wherein:
the transmit pulses of the first and second plurality of transmit pulses each have a different RF frequency, wherein the one or more digital processors are configured to transmit the transmit pulses of the first and second plurality of transmit pulses using the same polarization.

11. The system of claim 9, wherein the one or more digital processors are configured to transmit the transmit pulses of the first plurality of transmit pulses at a different polarization than the transmit pulses of the second plurality of transmit pulses.

12. The system of claim 11, wherein the one or more digital processors are configured to transmit the transmit pulses of the first plurality of transmit pulses at the first antenna polarization and the transmit pulses of the second plurality of transmit pulses at the second orthogonal antenna polarization.

13. The system of claim 9, wherein:
the first radar application is an air traffic control application and the second radar application is a weather radar application.

14. The system of claim 1, wherein:
one or more rows of the array antenna include dual polarized radiating elements and each row's corresponding T/R module has one horizontal polarization channel and one vertical polarization channel, wherein each channel has a variable phase shifter that is controllable by the one or more digital processors.

15. A method of operating a radar system having a rotating array antenna that includes a plurality of rows of radiating elements, wherein at least some of the rows display dispersive properties, the method comprising:
transmitting multiple pulses during a transmit portion of a pulse repetition interval (PRI) from the array antenna, each of the multiple pulses having a different RF frequency to form a transmit beam at a different azimuth angle from the other pulses, wherein transmitting multiple pulses includes transmitting each of the multiple pulses using beam spoiling to achieve a transmit beam that covers an elevation angle range of interest;
wherein transmitting includes operating a single transmit/receive (T/R) module per row of radiating elements;
processing return signals using digital beam forming (DBF) to develop a plurality of receive beams in elevation; and
processing data associated with the plurality of receive beams in elevation using maximum likelihood estimation (MLE) to estimate a target elevation angle.

16. The method of claim 15, further comprising:
processing return data associated with transmit beams at different azimuth angles using MLE to estimate a target azimuth angle.

17. The method of claim 16, wherein:
processing return data associated with transmit beams at different azimuth angles using MLE includes processing return data associated with transmit beams at different azimuth angles for multiple successive coherent processing intervals (CPIs), each of the multiple successive CPIs using a different pulse repetition frequency.

18. The method of claim 15, wherein:
transmitting multiple pulses during a transmit portion of a pulse repetition interval (PRI) from the array antenna includes transmitting a first plurality of pulses associated with a first radar application and transmitting a second plurality of pulses associated with a second radar application, wherein the first plurality of pulses use different RF frequencies than the second plurality of pulses.

19. The method of claim 15, wherein:
transmitting multiple pulses during a transmit portion of a pulse repetition interval (PRI) from the array antenna includes transmitting a first plurality of pulses associated with a first radar application and transmitting a second plurality of pulses associated with a second radar application, wherein the first plurality of pulses are transmitted at an orthogonal polarization with respect to the second plurality of pulses.

20. The method of claim 15, further comprising:
transmitting N successive PRIs at a first pulse repetition frequency (PRF) corresponding to a first coherent processing interval (CPI);

transmitting N successive PRIs at a second pulse repetition frequency (PRF) corresponding to a second CPI; and transmitting N successive PRIs at a third pulse repetition frequency (PRF) corresponding to a third CPI;

wherein N is a positive integer greater than 2.

21. A method, comprising:

operating a radar having an antenna with rows of frequency scannable dispersive elements, wherein each of the rows has phase control such that phase scanning is provided in an angle orthogonal to the frequency scan for providing a two-dimensional scan using only one phase shifter and/or T/R module per row.

22. The method according to claim 21, further including providing element rotation about an axis perpendicular to the rows of dispersive elements for providing 360° coverage.

23. The method according to claim 21, further including using the antenna split in two halves about the axis perpendicular to the antenna element axis; and using a first half of the antenna for transmit and a second half for receive.

24. The method of claim 21 further comprising:

operating with a first antenna polarization in a first channel of the T/R module; and operating with a second antenna polarization orthogonal to the first polarization in a second channel of the T/R module.

25. The method of claim 24 further comprising operating one or more digital processors to generate a recurring radar waveform that includes a plurality of transmit pulses, wherein a first plurality of transmit pulses have the first antenna polarization and a second plurality of transmit pulses have the second orthogonal antenna polarization.

26. The RF system of claim 1, wherein:

at least some of the plurality of rows of radiating elements comprise dual polarization antenna elements responsive to radio frequency (RF) signals having first and second orthogonal polarizations; and the respective T/R modules coupled to the rows of radiating elements comprising dual polarization antenna elements include a first channel configured to operate with a first RF signal polarization and a second channel configured to operate with the second, orthogonal signal polarization.

27. The RF system of claim 1, wherein:

each of the plurality of rows of radiating elements comprise dual polarization antenna elements responsive to radio frequency (RF) signals having first and second orthogonal polarizations; and each of the respective T/R modules includes include a first channel configured to operate with the first RF signal polarization and a second channel configured to operate with the second, orthogonal signal polarization.

28. The RF system of claim 1 further comprising a motor coupled to the array antenna and operable to rotate the array antenna about an axis.

* * * * *